United States Patent [19]

Sutton

[11] Patent Number: 4,759,058
[45] Date of Patent: Jul. 19, 1988

[54] SHOULDER REST FOR A TELEPHONE

[76] Inventor: Bernard S. Sutton, 128 Lafayette Ave., Brooklyn, N.Y. 11238

[21] Appl. No.: 48,029

[22] Filed: May 11, 1987

[51] Int. Cl.⁴ .............................................. H04M 1/04
[52] U.S. Cl. ..................................... 379/449; 379/430; 379/455
[58] Field of Search ................. 379/449, 455, 430, 433

[56] References Cited

U.S. PATENT DOCUMENTS

| 2,348,138 | 5/1944 | Latus et al. | 379/449 |
| 2,476,221 | 7/1949 | Renneker | 379/449 |
| 2,493,954 | 1/1950 | Epstein | 379/430 |
| 2,816,963 | 12/1957 | Norton | 379/449 |
| 3,567,871 | 3/1971 | Walter | 379/449 |

FOREIGN PATENT DOCUMENTS

| 2004701 | 8/1971 | Fed. Rep. of Germany | 379/449 |
| 726879 | 3/1955 | United Kingdom | 379/449 |

OTHER PUBLICATIONS

Disclosure Document 158165, "Telephone Handset Shoulder Support", filed Oct. 24, 1986.

Primary Examiner—Jin F. Ng
Assistant Examiner—Danita R. Byrd
Attorney, Agent, or Firm—Charles E. Baxley

[57] ABSTRACT

A contoured shoulder reset for use with a telephone to provide a more comfortable support and including an adjustable member which allows the shoulder rest to fit the shoulder more securely thereby making the unit more stable when in use as in intended.

3 Claims, 1 Drawing Sheet

SHOULDER REST FOR A TELEPHONE

BACKGROUND OF THE INVENTION

The invention relates to a contoured shoulder rest for use with a telephone and comprises a contoured stiff base or bottom portion which includes on the central section of the base a member for detachably connecting the rest to the central section or shank of the telephone. A contoured top portion which may have a cushioned outer surface is also formed or connected to the bottom and is generally provided with the same contour as the bottom. There is also included near one of the ends of the contoured portion of the shoulder rest a hinged member which provides adjustability to the end portion so that not only does the shoulder rest provide more comfort but also permits a more secure fit.

Prior patents such as U.S. Pat. Nos. 2,493,954 and 3,567,871 show examples of different types of shoulder rests.

In addition to distinctions which will be clear from the details which follow, none of those patents show the adjustability of the shoulder rest to provide a more secure fit and adaptability to different size shoulders. Reference is also made to disclosure document No. 158165 filed Oct. 24, 1986.

It is an object of the present invention to provide a shoulder rest which is comfortable and more secure when in use.

It is another object to provide such a shoulder rest which has asthetic qualities and at the same time can be easily manufactured.

Additional objects and advantages will appear from the descriptive discussion which follows.

SUMMARY OF THE INVENTION

A shoulder rest in accordance with the invention has a contoured stiff base or bottom provided with a centrally disposed telephone shank mounting portion or unit. The shank interconnects the transmitter and receiver of said telephone.

Mounted on the base or bottom is a contoured cushioned top member which is shaped or contoured in similar fashion to the base.

Further the base is hinged, to permit near one end thereof adjustment of the shoulder rest so that in addition to being more comfortable when in use there results a more secure mounting of the rest on the shoulder.

It is apparent that the invention attains the foregoing stated objects and others and the illustrated details are exemplary only except as to those details which may be included in the appended claims.

DESCRIPTION OF THE INVENTION

Figure 1:
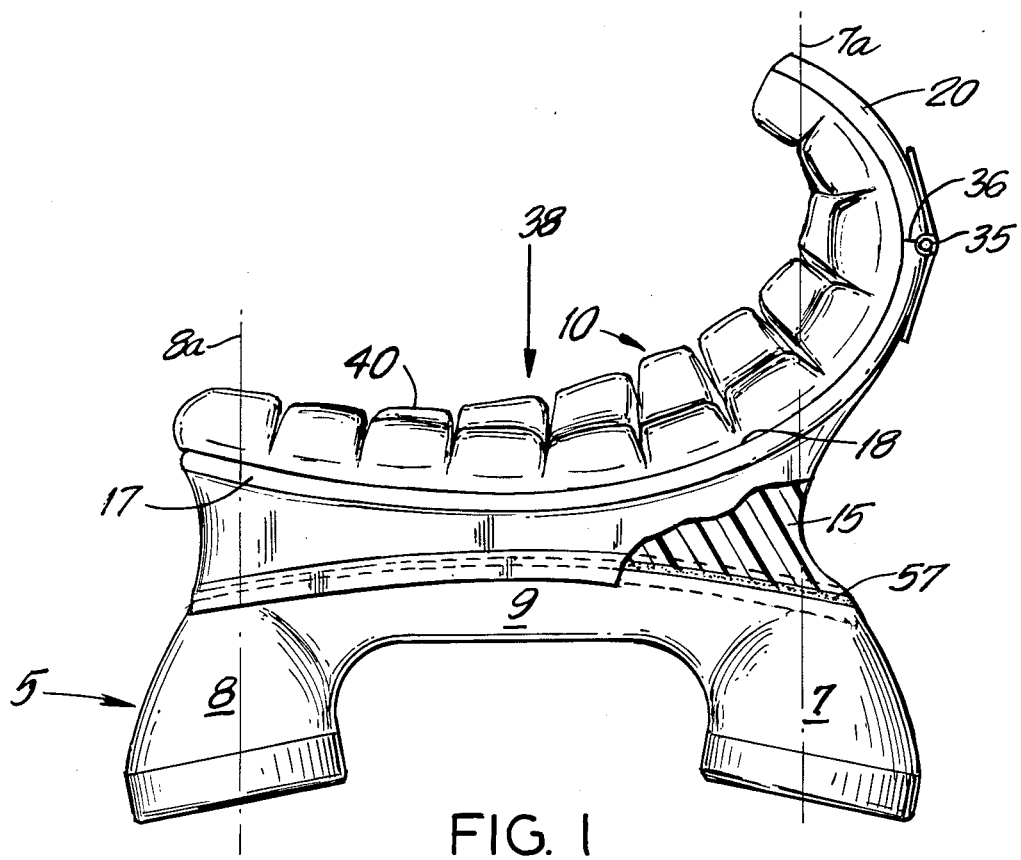
FIG. 1 is a side view of the shoulder rest of the present invention partly in cross section and shown mounted on a telephone.

The improvement will be first described with reference to FIGS. 1 and 2 of the drawings.

The usual telephone 5 including a transmitter 7 and a receiver 8 with a shank 9 is shown.

The shoulder rest, generally designated 10, is shown (FIG. 2) as detachably connected to the shank of the telephone.

More particularly the shoulder rest in its preferred embodiment, as shown in FIG. 1, comprises a contoured stiff base 15 shaped so that it is slightly curved as at 17, which is that portion lying above the transmitter 8 and progresses to a steeper concave shape as at 18 and then slopes upwardly to a near vertical slope as shown in FIG. 1 at the steep curved end 20. The more severe curvature is fashioned in a vertical plane through the telephone end lying close to the receiver 7 and shown by line 7-7a.

Figure 2:
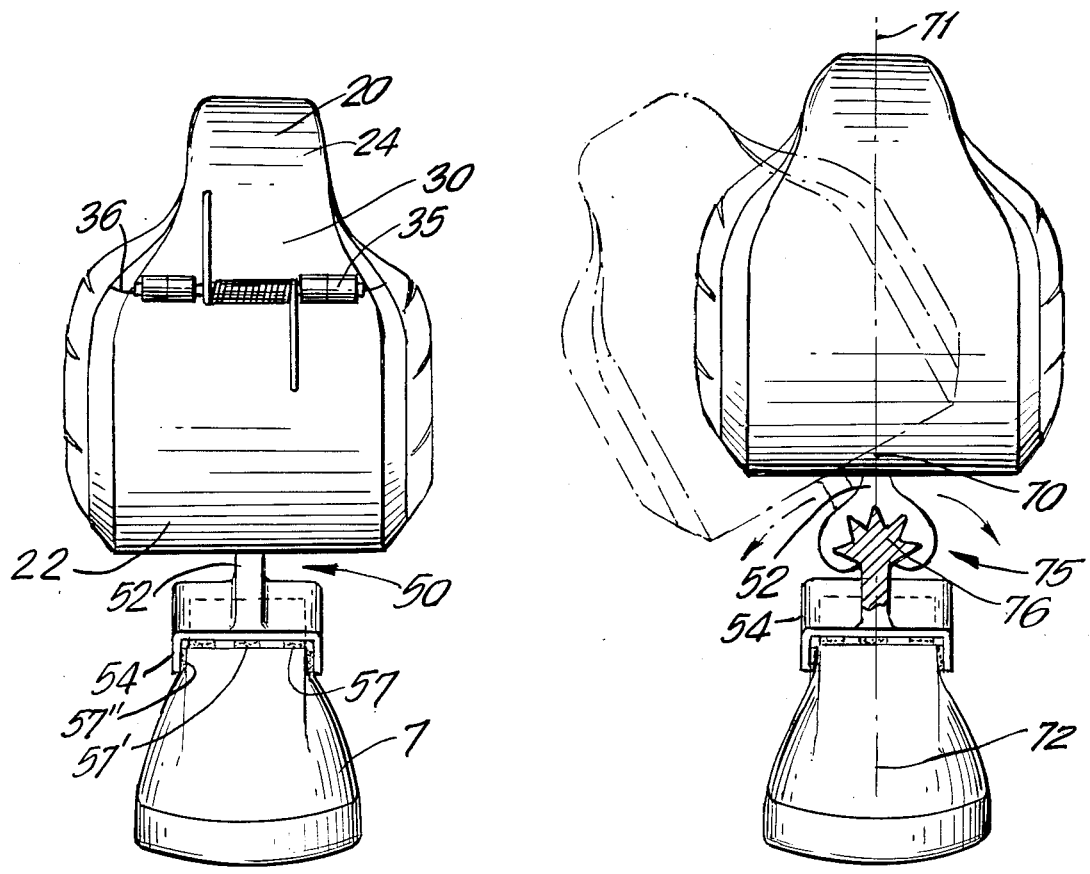
FIG. 2 is an end view of the shoulder rest showing the hinge detail and contour.

Additionally as shown in FIG. 2 the contour of the base is widest as at 22 in a vertical plane designated by line 8-8a through the transmitter 8 and subtantially narrow as at 24 in the portion of the rest which lies against the front of a person's shoulder when operative.

Preferably starting at the narrower dimension 24 of one end of the shoulder rest as shown in FIG. 2 there is provided a hinge 35 which permits movement of that end 30 of the shoulder rest against the front of the shoulder.

This hinge is normally spring loaded and causes the end portion 30 of rest to normally be disposed when not in use, towards the center 38 of the rest. Stops in any well known form (not shown) may be provided to limit the normal location or travel of said adjustable end 30. Also number 36 designates a split at the top of the shoulder rest to permit movement as indicated. This can be provided in any well known fashion.

In this fashion a degree of adjustment as desired is provided the rest so that it more securely fits the shoulder.

Mounted on top of the base, and having the same contour as said base, is a top portion 40—it is preferably padded with a soft foam like material to provide additional comfort for the user of the rest.

Connecting members generally designated 50 are formed as a part of the base 15 and comprise an extension 52 connected to the base 15 at one end and forming a U-shaped member 54 which is the size of a telephone shank.

The outer portion of adhesive strips 57, 57' and 57", some of which are shown in FIG. 2 are mounted on the inner portion of the U-shaped member, and serve to interconnect the shoulder rest to the shank of the phone.

Different approaches may be followed to connect the shoulder rest to the phone all within the scope of the concept herein described.

Figure 3:
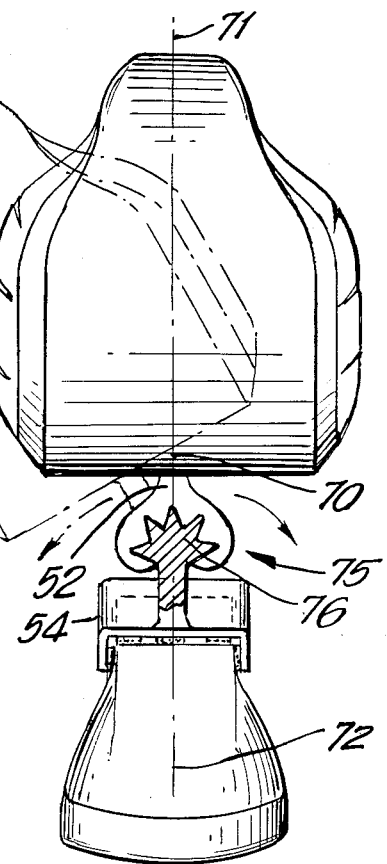
FIG. 3 is an end view of the shoulder rest partly in section showing another version of said shoulder rest.

In FIG. 3 there is shown a device 75 for adjusting the shoulder rest off a center line 70 running through the unit or rest from one end 71 to the other end 72. The adjustment may be provided by a rachet arrangement 76 well known in the art. It is simply disposed between the connector 54 and the top of the shaft 52 and is so constructed to permit plural adjustments in both directions off the center line 70.

I claim:

1. A shoulder rest for a telephone handset including a shank interconnecting a receiver at one end and a transmitter at the other end, said shoulder rest comprising a contoured shoulder support for comfortably supporting said telephone on a user's shoulder, said contoured shoulder rest further comprising a contoured stiff base and a contoured cushioned material top mounted on said base, said contoured cushioned material top to abut said user's shoulder to provide comfort when said shoulder rest is used with said telephone, and the contoured stiff base including at one end adjustment means which are moveable towards the user's shoulder so that, said shoulder rest when in use more securely grips said user's shoulder.

2. The shoulder rest of claim 1 including means for detachably connecting said shoulder rest to the shank of said telephone handset and said detachable connecting means being adjustable to move said shoulder rest to adjust the location of said handset on said shoulder relative to the user's mouth and ear.

3. The shoulder rest of claim 2 having a vertical center line passing through said transmitter end of the handset and said detachable connecting means is adjustable at a plurality of locations relative either side of said vertical center line.

* * * * *